US011225944B2

(12) United States Patent
Stewart

(10) Patent No.: US 11,225,944 B2
(45) Date of Patent: Jan. 18, 2022

(54) WIND ENERGY ASSEMBLY

(71) Applicant: Randal S. Stewart, Alma, MI (US)

(72) Inventor: Randal S. Stewart, Alma, MI (US)

( * ) Notice: Subject to any disclaimer, the term of this patent is extended or adjusted under 35 U.S.C. 154(b) by 142 days.

(21) Appl. No.: 15/877,450

(22) Filed: Jan. 23, 2018

(65) Prior Publication Data

US 2019/0226448 A1 Jul. 25, 2019

(51) Int. Cl.
*F03D 3/06* (2006.01)
*F03D 3/00* (2006.01)
*F03D 7/06* (2006.01)

(52) U.S. Cl.
CPC ............. *F03D 3/064* (2013.01); *F03D 3/005* (2013.01); *F03D 7/06* (2013.01); *F05B 2240/218* (2013.01)

(58) Field of Classification Search
CPC . F03D 3/005; F03D 3/067; F03D 7/06; F05B 2240/218
See application file for complete search history.

(56) References Cited

U.S. PATENT DOCUMENTS 4,365,935 A * 12/1982 Zukeran .................... F03D 7/06 416/117
4,406,584 A 9/1983 Stepp
4,470,770 A 9/1984 Grose
5,454,694 A 10/1995 O'Dell
5,570,997 A * 11/1996 Pratt ....................... F03D 3/067 416/117
6,682,302 B2 * 1/2004 Noble ..................... F03D 3/068 415/4.2
7,866,938 B2 1/2011 Karia
8,177,481 B2 * 5/2012 Liang ...................... F03D 3/067 415/4.2
8,206,106 B2 6/2012 Syrovy
8,390,142 B2 3/2013 Yan et al.
8,657,560 B2 2/2014 Grenier et al.
8,829,704 B2 9/2014 Grigg
9,011,096 B2 * 4/2015 Su ............................. F03D 3/02 416/111
9,024,463 B2 * 5/2015 Boone ..................... F03D 3/005 290/55

* cited by examiner

*Primary Examiner* — David Hamaoui
*Assistant Examiner* — Michael K. Reitz

(57) ABSTRACT

Wind energy assemblies which contain arrays of wind diodes, which arrays are assembled into a wind energy collector assembly.

3 Claims, 7 Drawing Sheets

16
25
25
16
1
23
25
27
16

25
16
27
25
23
25
16
1
16

WIND ENERGY ASSEMBLY

BACKGROUND OF THE INVENTION

This invention deals with wind energy assemblies which contain arrays of wind diodes, which arrays are assembled into a wind energy collector assembly.

The devices of this field of use include among others, energy extraction devices, windmills, wind turbines, oscillating windmills, and the like.

One such device can be found in U.S. Pat. No. 8,657,560 that issued on Feb. 25, 2014 to Grenier, et al which deals with an energy extraction device for extracting energy from a flow of fluid. There is a rotatable bank of blades connected to a central rotating member. The essence of the invention seems to be a pitch control system for the blades. The panels are rigidly mounted vertically with regard to the central rotating member.

U.S. Pat. No. 4,406,584 that issued to Stepp on Sep. 27, 1983 that deals with a vertical axis windmill with multistage feathering of blades and safety storm control. The device consists of circumferentially and radially outwardly spaced rotatably mounted vanes that are vertically parallel to the axis shaft. The essence of the invention seems to be the ability to feather the vanes.

U.S. Pat. No. 5,454,694 that issued to O'Dell on Oct. 3, 1995 deals with a vertical axis wind mill with retractable sails. It comprises a central core which has vertical side walls in a generally cylindrical configuration. The essence of the invention seems to be that the sails are radially retracted by coiling up into a lower portion of a U-shaped bracket.

David Grose, in U.S. Pat. No. 4,470,770 that issued Sep. 11, 1984, teaches a wind powered apparatus consisting of an elongated boom with fee wings mounted on the fore and aft ends of the boom. The essence of the invention seems to be the ability to control the free wings.

U.S. Pat. No. 8,390,142, that issued on Mar. 5, 2013 to Yan, et al, deals with a vertical axis wind turbine. The essence of the invention seems to be the combination of a vertical axis with the vertical axis of a generator for purposes of efficiency.

U.S. Pat. No. 7,866,938 that issued Jan. 11, 2011 to Kariya deals with a vertical axis windmill with guiding device. The essence of the invention is the guiding devices.

In U.S. Pat. No. 8,829,704 that issued Sep. 9, 2014 to Grigg, there is disclosed a wind turbine generator and motor that includes a plurality of wing assemblies having vertical pivot shafts extending between two vertically space end assemblies that are joined to a central driveshaft assembly. The wing assemblies appear to be fixed in a vertical position.

U.S. Pat. No. 8,206,106, that issued Jun. 26, 2012 to Syrovy, deals with an oscillating windmill composed of an extended bar centrally located on a vertical shaft. The bar has a moveable paddle on each end that is manipulated by a clutch assembly.

None of the devices set forth above anticipate or make obvious the devices of this invention.

THE INVENTION

The invention, in one embodiment, deals with a wind diode. The wind diode consists essentially of a unitary construction. The wind diode comprises a flat panel having a first end and a second end, a back surface, a front surface, a center point located between the first end and the second end, and two outside edges.

There are air containment ridges located on each of the outside edges on the back surface, the containment ridges extending from the first end to the second end. There is a rod support area located on each outside edge on the front surface near the center point.

There is a rod located in said the supports which rod extends outwardly from the rod supports. There are at least two stop pins located in each of the rod support area at a predetermined location.

There is a predetermined weighted air foil integrally located on the front surface at the first end, the weighted air foil extending across the flat panel from edge to edge, the weighted air foil having a predetermined width.

In a second embodiment, there is an array of wind diodes of this invention wherein at least six such diodes have a pattern of three, side by side wind diodes as an upper layer and three, side by side wind diodes as a lower layer. Each array is contained within a frame, the frame being capable of attachment to a rotating member.

In a further embodiment, there is a wind collector assembly. The wind collector assembly comprises at least one array of this invention. Each array is connected to a common rotating member through a connection disposed radially from a main vertical axis of rotation of said rotating member. Each array is disposed an equal distance apart from any remaining arrays.

There is contemplated within the scope of this invention to provide equipment for receiving energy created by the wind collector.

DETAILED DESCRIPTION OF THE INVENTION

This invention deals with wind energy assemblies which contain arrays of wind diodes, which arrays are assembled into a wind energy collector assembly.

FIGS. 1, 2, 3, and 7 show a wind diode 1 of this invention. The wind diode 1 is of unitary construction. The wind diodes 1 are singular units comprised of two modified air foils, with an inverted air foil in the leading edge 6 which is constructed to hold it stable against retention pins 5 (stop pins) while in the open position, and an overall air foil shape on the flat panel constructed to lift the foil into a low wind drag configuration.

Figure 1:
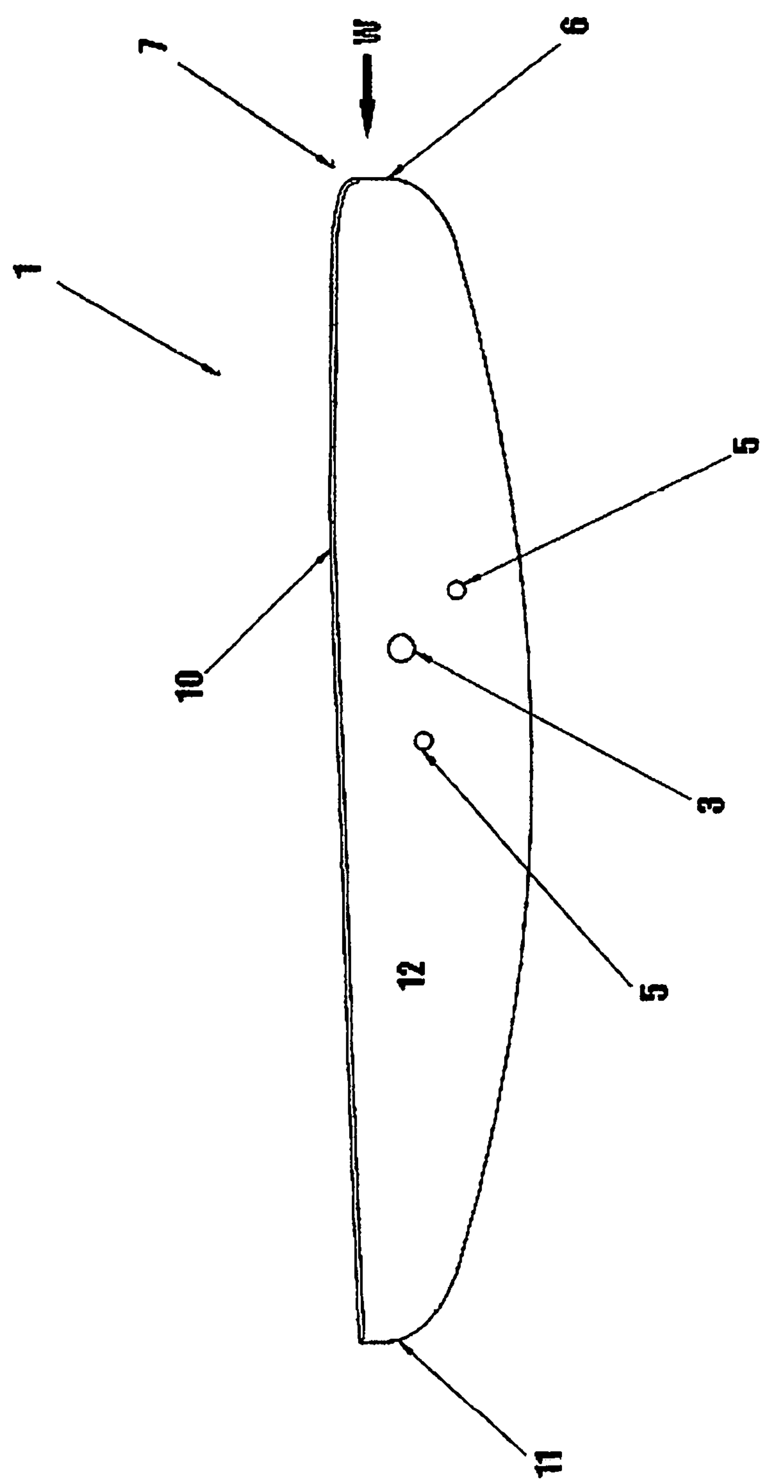
FIG. 1 is a full side view of one side of a wind diode of this invention.
Figure 2:
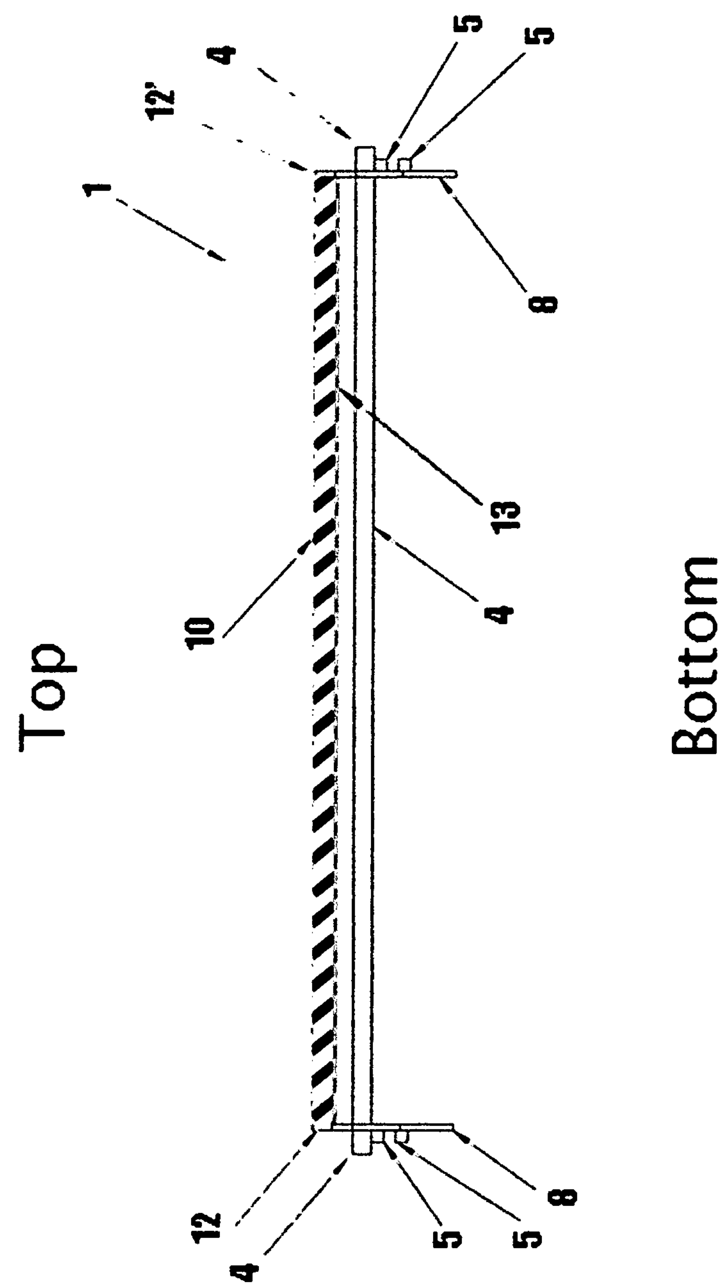
FIG. 2 is a full end view of the diode of FIG. 1.
Figure 3:
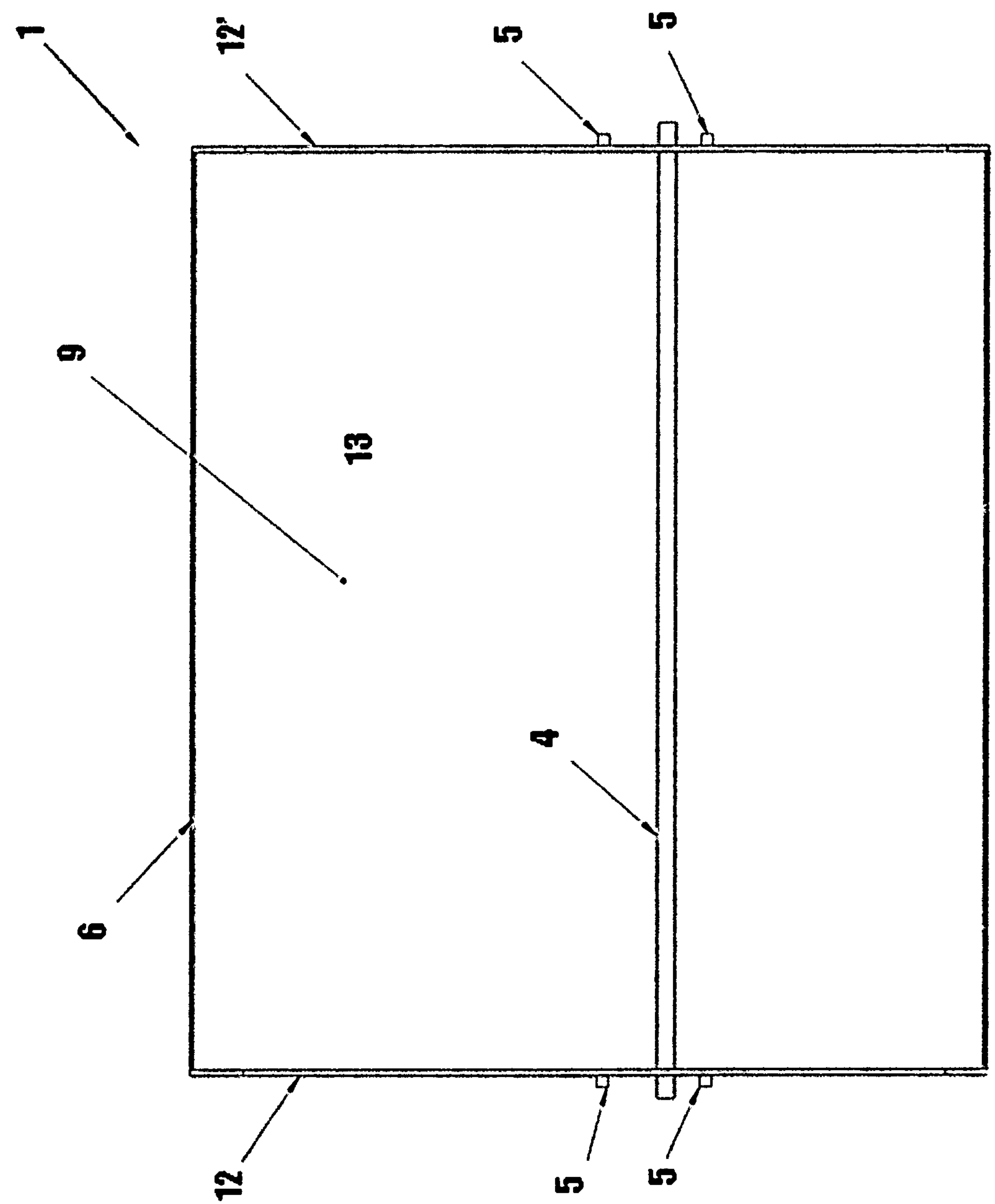
FIG. 3 is a full back view of a diode of FIG. 1.

FIG. 1 is a full side view of the diode 1. Each side of the diode 1 is identical to the other. Located in each side is an area which constitutes a support area with an opening 3. The opening 3 receives common rod 4 (FIGS. 2 and 3). Note that the openings 3 and the rod 4 are not are not at the center of mass, but are off-set from center by a small amount to put weight on end 11 of the diode 1. There is also shown stop pins 5 which prevent the diode 1 from making a complete rotation around the rod 4. The pins 5 are also responsible for holding the wind diode flat and stable once the wind diode 1 has moved to a horizontal position. The wind diode 1 has a tendency to vibrate sufficiently strong in the wind such that it creates a drag on the array and thus, the pins 5 can decrease or stop this vibration and provide more efficiency to the array.

With reference to FIG. 1, each diode 1 is constructed of a flat panel 9 (shown in FIG. 3). The flat panel 9 has a back surface 13, (FIG. 3), a front surface 10 (FIG. 2), a first end 6 with the designation <------- W, to designate the direction of the wind to the diode, a second end 11, and two outside edges 12 and 12' (FIG. 2).

A first end 6 is rounded in the form of an air foil 7. The air foil 7 has a weight that is predetermined such that when wind is not pressing against the diode 1, the weight will draw the diode 1 downward in a vertical position, so that its profile can catch any wind.

FIG. 2 is a full end view of the diode 1 in which there is shown the rod 4, stop pins 5, and containment ridges 8. Air pressure on the air foil 7 is better maintained through containment ridges 8 on both outside edges of the air foil 7 on the back side which wind pushes against 13. This reduces air bleed over the edges of the diode 1.

Figure 4A:
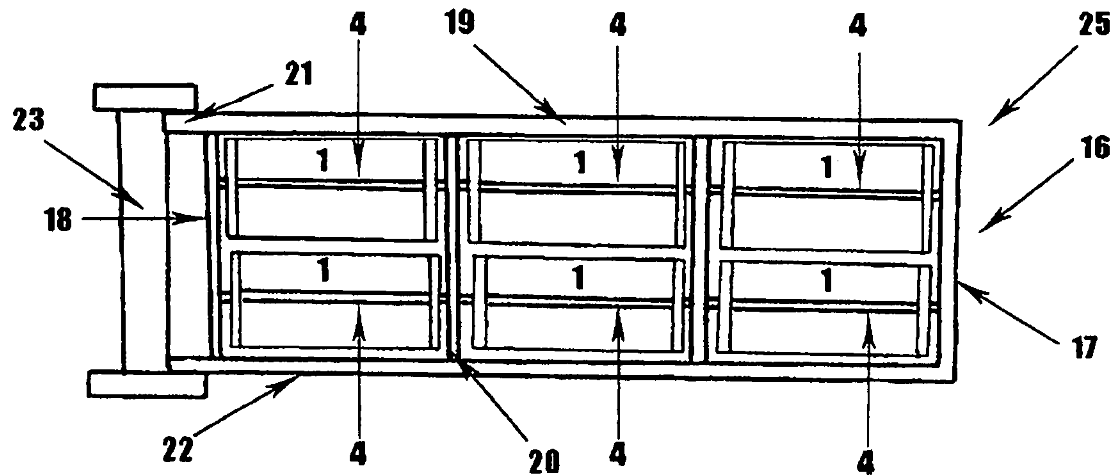
FIG. 4A is a full back view of an array of this invention made up of wind diodes of FIG. 1.
Figure 4B:
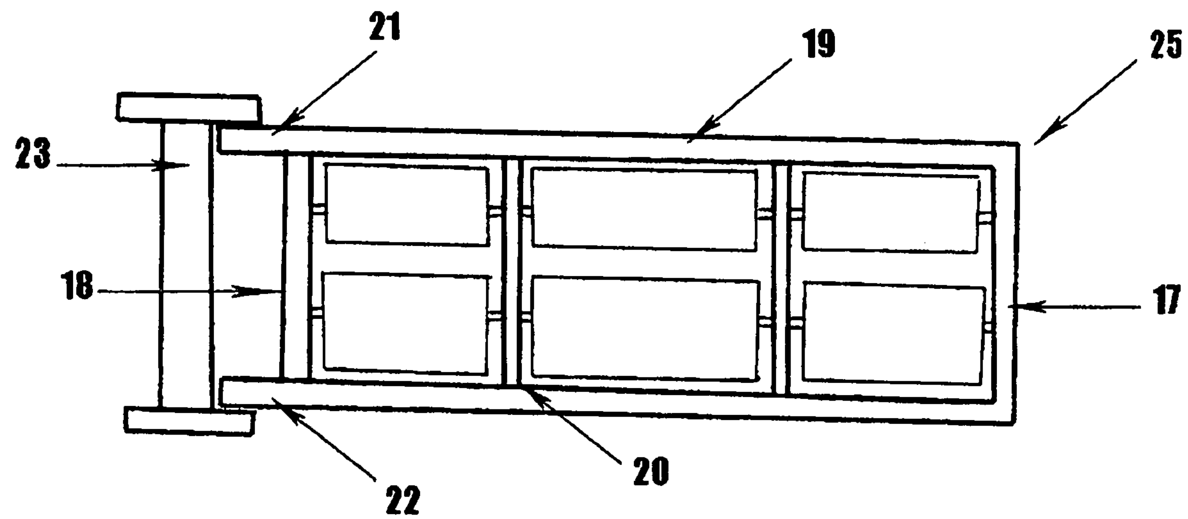
FIG. 4B is a full front view of an array of FIG. 2A.

Turning now to the use of the diodes 1, there is shown in FIG. 4A, a full back surface of an array 25 of wind diodes 1 of this invention, constituting one layer of the entire assembly. Shown in FIG. 4B is a full front side of an array 25 of FIG. 4A. Turning to FIG. 4B, there is shown an outside frame 16 constituted of component end pieces 17 and 18 and upper bar 19 and lower bar 20 that are rigidly fixed together. Situated within the frame 16 are the diodes 1, which are supported in the frame 16 by rods 4. The drawing has depicted the diodes 1 as having a large clearance with regard to the frame, but in use, the diodes 1 have essentially no clearance within the frames, just enough to allow the diodes 1 to rotate on the rod 4. It should be noted that there are two elongations 21 and 22 which are connected to a common rotatable post 23.

As shown in FIG. 2, there are the diodes 1, and the whole of rod 4 supporting the diodes 1 within the frame 16. Again, the diodes 1 are shown with enlarged clearances between the diodes 1 and the frame, when in use, there are no large gaps, just enough of a gap for the diode 1 to rotate on the rod 4.

Figure 5:
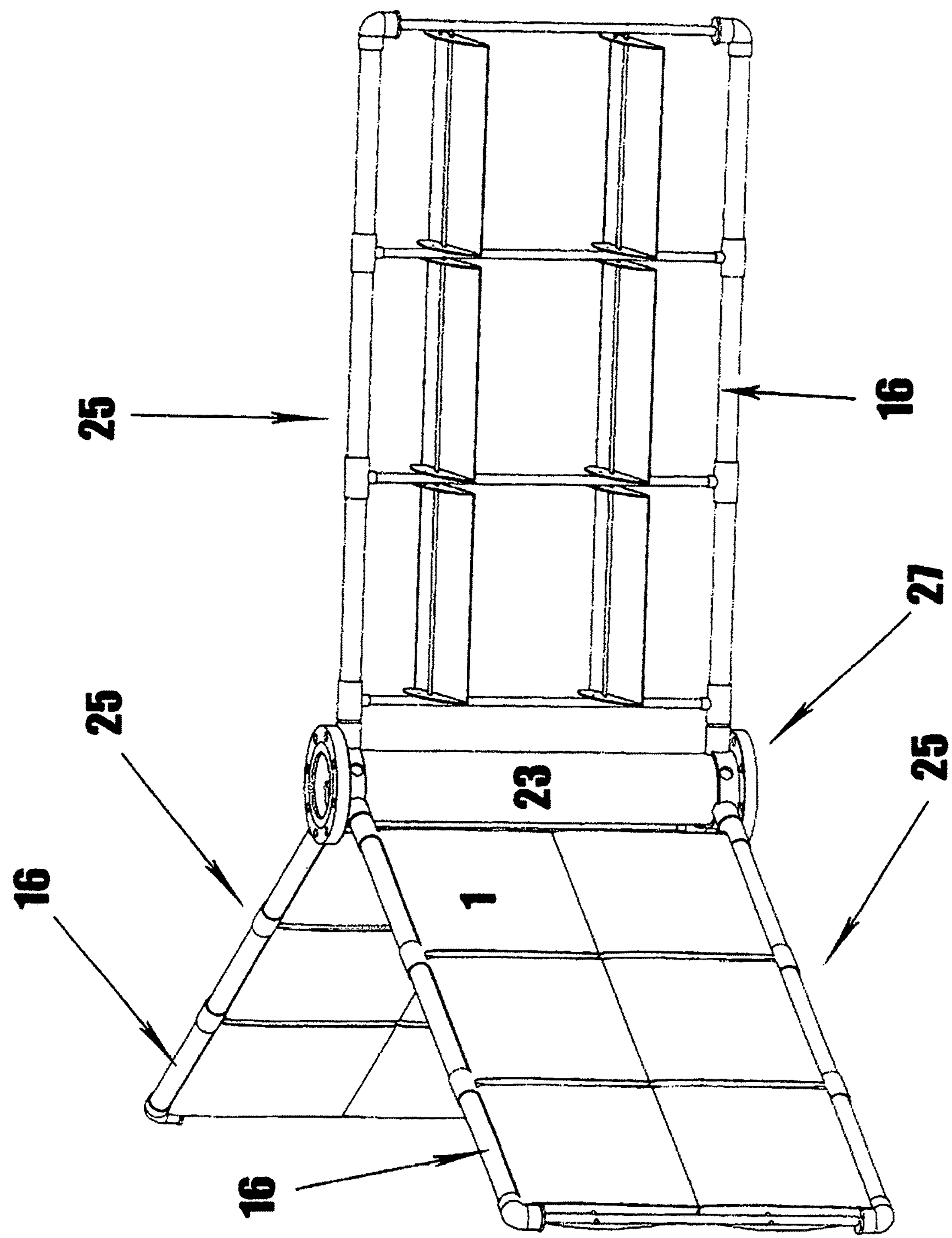
FIG. 5 is a view in perspective of an array of wind diodes making up one level of an assembly of this invention.
Figure 6:
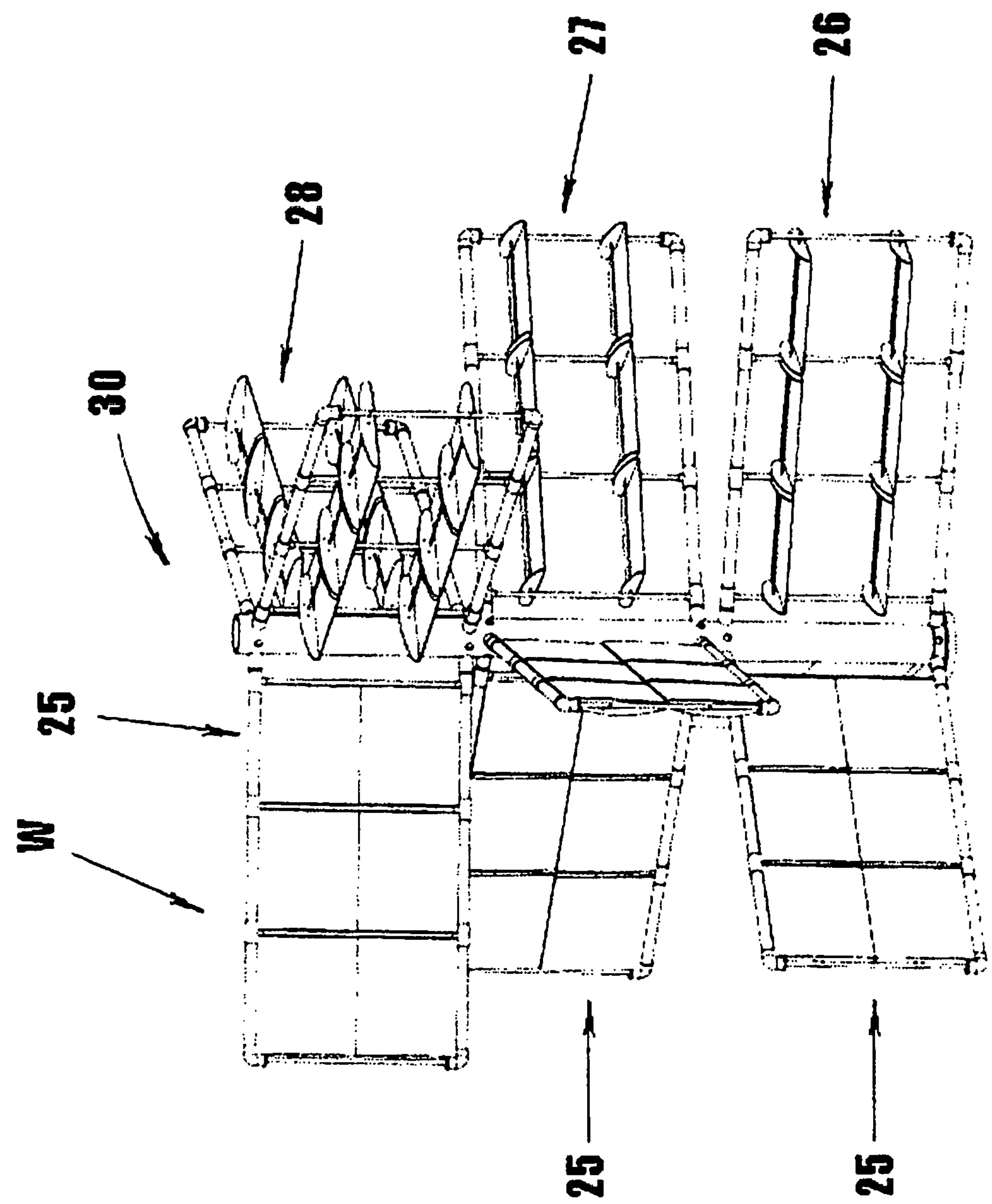
FIG. 6 is a full assembly of this invention showing three levels of arrays.
Figure 7:
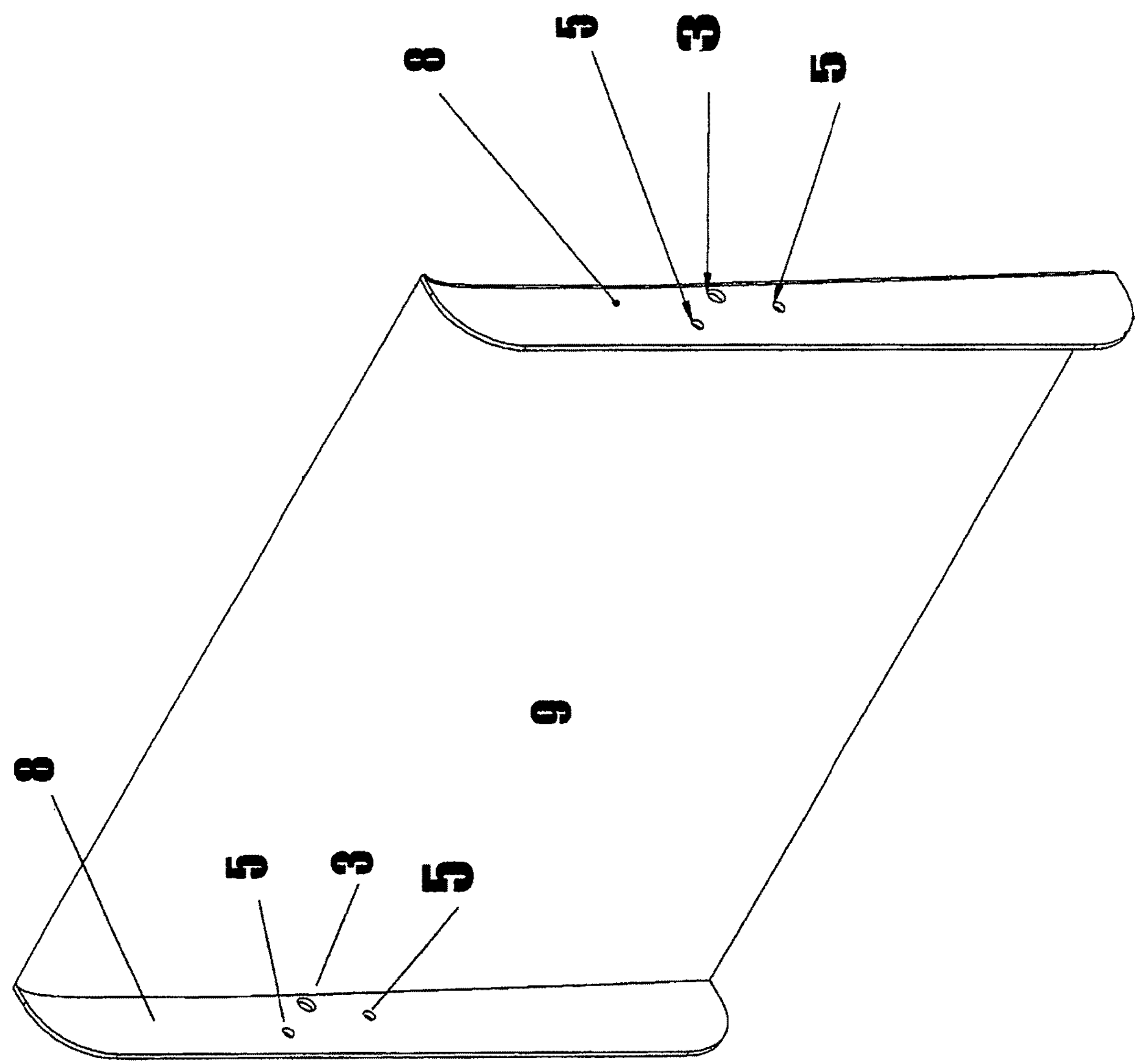
FIG. 7 is a full view in perspective of a diode of this invention.

FIG. 5 shows an elevation of an assembly 30 of the arrays 25 in use. It should be noted that each of the arrays 25 are mounted in rows or layers one on top of the other. Shown in FIG. 6 are three layers 26, 27, and 28, but any number of layers is okay as long as the assembly device holds its efficiency. Maximum placement of the arrays 25 is created through a uniform matrix on each frame of the structure. Power fluctuation is reduced by stacking, offsetting, and configuring arm spacing between multiple layers of the assembly as shown in FIG. 3. Power output fluctuation per rotation is reduced from approximately 85% with a single layer configuration of this assembly, to approximately a three percent power variation by stacking the units and offsetting each layer so that each bank of diodes 1 are engaged at an equidistant relationship relative to the rest of the assembly arms.

Shown in FIG. 5 is the central rotating post 23, diodes 1, frame 16, anchoring point 27 for the central rotating post 23.

FIG. 6 shows the diodes 1 with regard to wind (W------> indicates wind direction).

The assemblies 30 of this invention achieve rated output at low wind speeds, i.e. 12 to 15 miles per hour wherein the industry standard is 27 miles per hour to achieve rated output. Current low speed components create a long construction life i.e. about 20 years estimated.

The devices of this invention eliminate bird kill because the structure turns at wind speed or slower whereas air foil constructions are accelerated far in excess of wind speed and are often deadly to life. (the birds contact the blades while the blades are revolving).

The device of this invention eliminates air foil flutter that would otherwise sap energy, yet it creates accelerated movement through the open/closing cycle. The use of retention pins allows a construction that concentrates the contact area force and allows dissipation of the rotational energy within the diode 1 through the structure in a way that reduces or eliminates noise. The diode 1 allows management of the wind drag through construction manipulation. It is balanced on the center axis with a minimal weight distribution toward the closed positon. Wind drag is balanced between the inverted air foil on the top end of the diode and the weight on the bottom edge.

Wind diodes open and close without interference from rotation forces, thereby increasing efficiency. The horizontal mounting of the diodes 1 concentrates rotational force upon the outside horizontal shaft bearings, where it can be maintained as static pressure.

Examples

What is claimed is:

1. A wind diode, said wind diode comprising in combination:

a. a predetermined weighted air foil having a predetermined width and length, said air foil having a first end, a second end, a back surface, a front surface, a center point of mass unequal to a geometric center of said air foil, located between said first end and said second end, and two outside edges;

b. air containment ridges located on each said outside edges on said front surface, said containment ridges extending from said first end to said second end;

c. a rod support area located on each said outside edge on said back surface near said mass center point;

d. a rod contained in said rod support area which rod extends outwardly from said rod support area;

e. at least two stop pins located in each of said rod support areas at a predetermined location.

2. A horizontally oriented array of said wind diodes as claimed in claim 1 wherein at least six such diodes have a pattern of three, side by side wind diodes as an upper layer and three, side by side wind diodes as a lower layer, each said array being contained within a frame, said frame being capable of attachment to a rotating member.

3. A wind collector assembly, said wind collector assembly comprising:

a. at least one array as claimed in claim 2, each said array connected to a common rotating member through a connection disposed radially from a man vertical axis of rotation of said rotating member each said array being disposed an equal distance apart from any remaining said array.

* * * * *